(12) United States Patent
Wilcox (10) Patent No.: US 7,465,018 B2
(45) Date of Patent: Dec. 16, 2008

(54) PRINTING SYSTEM

(75) Inventor: Michael Arthur John Wilcox, Whitchurch (GB)

(73) Assignee: Only the First Limited Technium Digital, Singleton Park Swansea (GB)

( * ) Notice: Subject to any disclaimer, the term of this patent is extended or adjusted under 35 U.S.C. 154(b) by 197 days.

(21) Appl. No.: 11/403,199

(22) Filed: Apr. 13, 2006

(65) Prior Publication Data

US 2006/0256177 A1 Nov. 16, 2006

Related U.S. Application Data

(63) Continuation of application No. 10/755,674, filed on Jan. 13, 2004, now Pat. No. 7,058,339.

(60) Provisional application No. 60/442,518, filed on Jan. 27, 2003.

(30) Foreign Application Priority Data

Jan. 13, 2003 (GB) ................... 0300640.0
Sep. 19, 2003 (GB) ................... 0321979.7

(51) Int. Cl.
*B41J 2/205* (2006.01)

(52) U.S. Cl. ..................... 347/43; 106/31.13

(58) Field of Classification Search ............... 347/15, 347/43, 95, 96, 100; 106/31.13, 31.16; 399/54, 399/57, 223, 237–238
See application file for complete search history.

(56) References Cited

U.S. PATENT DOCUMENTS

| 2,508,213 | A | 5/1950 | Ball |
| 4,249,318 | A | 2/1981 | Anderson et al. |
| 4,313,684 | A | 2/1982 | Tazaki et al. |
| 4,818,285 | A | 4/1989 | Causley et al. |
| 4,878,977 | A | 11/1989 | Kueppers |
| 5,440,328 | A | 8/1995 | Nardone et al. |
| 5,534,051 | A | 7/1996 | Lauw |
| 5,563,724 | A | 10/1996 | Boll et al. |
| 5,656,071 | A | 8/1997 | Kappele et al. |
| 6,059,407 | A | 5/2000 | Komatsu et al. |
| 6,066,422 | A | 5/2000 | Blaszak et al. |
| 6,152,999 | A | 11/2000 | Erdtmann et al. |

(Continued)

FOREIGN PATENT DOCUMENTS

DE 3622535 1/1988

(Continued)

OTHER PUBLICATIONS

Wilcox, "Blue and Yellow don't Make Green", 2002, School of Colour Pubications, Bristol, XP002284023, pp. 30-35.

(Continued)

*Primary Examiner*—Lamson D Nguyen
(74) *Attorney, Agent, or Firm*—Patricia Smink Rogowski (57) ABSTRACT

A color printing system comprising a combination of at least four, and preferably six coloring materials, each of a different color, wherein these colors are selected from (1) an orange-red; (2) a violet-red; (3) a violet-blue; (4) a green-blue; (5) a green-yellow; and (6) an orange-yellow; as well as white and black. This system may be incorporated into a wide range of printing devices and provides achieving of a wide range of colors.

30 Claims, 2 Drawing Sheets

U.S. PATENT DOCUMENTS

| | | | |
|---|---|---|---|
| 6,526,244 B1* | 2/2003 | Viturro et al. | 399/237 |
| 6,538,049 B1 | 3/2003 | Kappele et al. | |
| 6,613,136 B1 | 9/2003 | Arita et al. | |
| 6,824,262 B2 | 11/2004 | Kubota et al. | |
| 6,843,840 B2 | 1/2005 | Kataoka et al. | |
| 7,015,259 B2 | 3/2006 | Kataoka et al. | |
| 7,201,794 B2 | 4/2007 | Ito et al. | |
| 2003/0097960 A1 | 5/2003 | Ito et al. | |
| 2003/0116055 A1 | 6/2003 | Kubota et al. | |
| 2004/0017406 A1 | 1/2004 | Kato et al. | |
| 2004/0092621 A1 | 5/2004 | Kataoka et al. | |
| 2004/0103818 A1 | 6/2004 | Kataoka et al. | |
| 2005/0041082 A1 | 2/2005 | Kataoka | |
| 2005/0075449 A1 | 4/2005 | Kubota | |
| 2005/0139124 A1 | 6/2005 | Ito et al. | |

FOREIGN PATENT DOCUMENTS

| | | |
|---|---|---|
| DE | 3622535 A | 1/1988 |
| EP | 0 738 767 A1 | 10/1996 |
| EP | 0738767 | 10/1996 |
| EP | 0933406 | 8/1999 |
| EP | 1048702 | 11/2000 |
| EP | 1 389 002 A1 | 2/2004 |
| EP | 1403334 | 3/2004 |
| JP | 1044473 | 2/1989 |
| JP | 10-44473 A | 2/1998 |
| JP | 10179551 | 7/1998 |
| JP | 11325340 | 11/1999 |
| JP | 2000181364 | 6/2000 |
| JP | 2000337616 | 12/2000 |
| JP | 2001295153 | 10/2001 |
| JP | 2002014822 | 1/2002 |
| JP | 2002060766 | 2/2002 |
| JP | 200297126 | 3/2002 |
| JP | 200297127 | 3/2002 |
| JP | 2002132353 | 5/2002 |
| JP | 2002226686 | 8/2002 |
| JP | 2003503718 | 1/2003 |

OTHER PUBLICATIONS

J.A.C. Yule, *Principles of Color Reproduction* (1967), pp. 21-25, 151-154, 215-216, 260-266, John Wiley & Sons, Inc.
R.W.G. Hunt, *Measuring Colour* (1998), pp. 1, 18, 204-207, 257, 3rd edition, Fountain Press.
R.W.G. Hunt, *The Reproduction of Colour* (2004), pp. 4 and 5, 6th Edition, Wiley.
L.M. Hurvich, *Color Vision* (1981), p. 39, Sinauer Associates, Inc.
H.D. Murray, *Colour in Theory and Practice* (1952), p. 6, Chapman and Hall.
D.L. Macadam, *Color Measurement* (1981), p. 3, Springer Verlag.
G.G. Field, *Color and Its Reproduction* (1999), p. 125, 2nd Edition, GATF Press.
G.G. Field, *Color and Its Reproduction* (2004), p. 104, 3rd Edition.
G.F. Field, Color Essentials—Color and Quality for the Graphic Arts and Sciences (2001), pp. 7-13, GATF Press.
R.M. Evans, *An Introduction to Color* (1948), pp. 231-2323, John Wiley & Sons Inc.
W.D. Wright, *The Measurement of Colour* (1969), pp. 274-275, 4th Edition, Adam Hilger Ltd., London.
Eric J. Stollnitz, et al., *Reproducing Color Images Using Custom Inks, Stillness* (1998), pp. 1-8, 267-274, Siggraph.
Ostromoukhov, *Chromaticity Gamut Enhancement by Heptatone Multi-Color Printing* (1993), pp. 139, 148, EPFL, SPIE vol. 1909, Peripheral Systems Lab.
A. Blayo, et al., *Rheological Properties of Highly Pigmented Inks: Consequences on the Color Printing Quality* (1998), pp. 600-617, TAGA.
Siren, et al., *Experimenting with Hifi-Printing Techniques* (1995), pp. 304-320, TAGA.
Dibernsardo, et al., *Hi-fi Color* (1994), Presented at the 38th NAPIM Technical Conference in Philadelphia, Pennsylvania, Pantone, Inc.
J. Itten, *The Art of Color* (1961), pp. 34, 36, 114-119, Van Nostrand Reinhold Company.
S. Quiller, *Color Choices* (1989), pp. 12-15, 17, 23, 28-31, 80-81, 84-85, 101, Watson-Guptill Publications.
J. Itten, *The Color Star* (1985), Figures 1-6, Van Nostrand Reinhold Company.
P. Zelanski, et al., *Color* (1999), pp. 2, 14-21, 3rd Edition, Prentice Hall.
S. Cohen, et al., *The Non-Designer's Scan and Print Book* (1999), pp. 143-146, Peachpit Press.
A. Pipes, *Production for Graphic Designers*, (1998), pp. 87-94, 3rd Edition, The Overlook Press.
C. De M. Bezerra, et al., *Colour Matching for Ink-Jet Prints on Paper* (1998), pp. 18-27, vol. 23, Color Research and Application, Northeastern University Library.
R.M. Leekley, et al., *The Ball Four and Five-Color Systems* (1953), pp. 78-88, Proceedings of the Fifth Annual Technical Meeting, Technical Association of the Graphic Arts.
D. Drucker, *Reproduction Offset-GmbH* (Nov. 1990), 7302 Ostfildern.
V. Ostromoukhov, *Chromaticity Gamut Enhancement by Heptatone Multi-Color Printing* (1993), pp. 139-151, SPIE vol. 1909, Peripheral Systems Lab.
*Graphic Communications World* (Feb. 21, 1994), one page, Bi-Weekly, Green Sheet Communications, Inc.
L.W. Macdonald, et al., *Extending the Colour Gamut of Printed Images* (1994), vol. 42, Journal of Photographic Science.
A. Paul, *Brighter Colours, Higher Costs: 7, Colour Printing Opens up New Possibilities in Specific Sections of the Market* (1996), pp. 12-14, vol. 40, No. 6, Professional Printer.
K. Schlapfter, *The Colour Gamut of the Seven-Colour Printing Process* (1997), pp. 22-25, vol. 1, Research & Technology.
J.A.S. Viggiano, et al., *Colorant Selection for Six-Color Lithographic Printing* (1998), pp. 112-115, The Sixth Color Imaging Conference: Color Science, Systems, and Applciations.
S.T. Ingram, et al., *Ink Fingerprinting* (1998), pp. 660-671, TAGA Proceedings.
D. Tzeng, et al., *Spectral-Based Ink Selection for Multiple-Ink Printing II. Optimal Ink Selection* (1999), pp. 182-187, The Seventh Color Imaging Conference: Color Science, Systems, and Applications.
K. Schlapfer, *Classification of Colour Gamuts of Printing Processes* (2000), pp. 112-129, TAGA Proceedings.
Society of Dyers and Colourists, *Colour Index Hue Indication Chart*, American Association of Textile Chemists and Colorists, The Six '339 Colors (approx.).
F. Simon, *Color Print-Out of CIELAB Color Names*, Graphics Department of Chemson University by Garett Long, et al.
K. Kelly, *The Universal Color Language*, pp. A-1, and A-15, U.S. Department of Commerce.
Pantone Colors (Process Colors).
A. Perni, et al., *Color to Rival the Original*, (1988), Step-by-Step, A New Kind of Color Guide, p. 53.
M. Walter, *Beyond Four-Color: The Quest for Hi-Fi Color* (1998), pp. 39-44, American Ink Marker.
R.S. Berns, *Challenges for Colour Science in Multimedia Imaging* (1999), pp. 100-127, Colour Imaging: Vision and Technolgy.
*Kaleidoscope of e-Mering Technologies* (1999), TAGA '99 Vancouver, TAGA Proceedings, www.taga.org, No. 129.
S.T. Ingram, et al., *More than CMYK* (1999), pp. 583-593, TAGA Proceedings.
G.G. Field, *Color and Its Reproduction* (1999), pp. 126-127, 156-159, 2nd Edition, GATF Press.
W. Macdonald and M.R. Luo, *Colour Imaging* (1999). Chapter 6, p. 117, John Wiley & Sons, Ltd., Chichester, England.
*Chambers Dictionary of Science and Technology* (1974), p. 1072, revised edition, W. & R. Chambers, Ltd., Edinburgh.
L. Yang and B. Kruse, *Journal of Imaging Science and Technology* (2004), p. 262, 48, No. 3, May/Jun.
J.A.C. Yule, *Principles of Color Reproduction* (1947), pp. 190-191, Wiley.

R.W.G. Hunt, *The Reproduction of Colour* (1995), pp. 611-615, 655-657, 177-185, 5th Edition, Fountain Press.
*The HiFi Color Process* (2002), pp. 1-3, Graphics Communications Section No. 508, Community College of Southern Nevada, R08/02.
*High Fidelity Printing*, pp. 1-5, WilsonHurst.com/Technology/hifi/hifi.
Coates, *IDS-LV Installation at Walkers of Manchester* (2000), Coates.com/screen/magazine.issue 5/6.
R.S. Berns, *Principles of Color Technology* (2000), pp. 3, 20, 56-70, 157-161, 161-165, 170-174, third edition, John Wiley & Sons, Inc.
Wilcox, Michael, *Blue and Yellow Don't Make Green* (1999), The School of Colour Ltd., Bristol, U.K.
Wilcox, Michael, *Blue and Yellow Don't Make Green*(2004), 2nd Edition, The Michael Wilcox School of Color Publishing, Ltd.
Wilcox, Michael, *Blue and Yellow Don't Make Green* (2006), 2nd Edition, The Michael Wilcox School of Color Publishing Ltd.
J.A.C. Yule, *Principles of Color Reproduction (1947)*, pp. 190-191, Wiley.
R.W.G. Hunt, *The Reproduction of Colour* (2004), 6th Edition, pp. 4 and 5, Wiley.
HD. Murray, *Colour in Theory and Practice* (1952), p. 6, Chapman and Hall.
Ostromoukhov, *Chromaticity Gamut Enhancement by Heptatone Multi-Color Printing* (1993), EPFL, SPIE vol. 1909, pp. 139, 148 (Peripheral Systems Lab.
Dibernsardo, et al., *Hi-Fi Color* (1995), 38th NAPIM Technical Conference, Philadelphia, Pennsylvania, Pantone, Inc.
P. Zelanski, et al., *Color* (1999), 3rd Edition, pp. 2, 14-21, Prentice Hall.
Deutscher Drucker, *Reproduction Offset-GmbH* (in German), 7302 Ostfildern 1111990.
Victor Ostromoukhov, *Chromaticity Gamut Enhancement by Heptatone Multi-Color Printing* (1993), SPIE vol. 1909, pp. 139-151, Peripheral Systems Laboratory.
*Graphic Communications World* (Feb. 21, 1994), one page, Published Biweekly by Green Sheet Communications, Inc.
Ari Siren, et al., *Experimenting with Hifi-Printing Techniques* (1995), vol. 1, pp. 304-320, Technical Association of Graphic Arts (TAGA) Proceedings.
L.W. MacDonald, et al., *Extending the Colour Gamut of Printed Images* (1994), vol. 42, Journal of Photographic Science.
Andreas Paul, Brighter Colours, Higher Costs: 7, Colour Printing Opens up New Possibilities in Specific Sections of the Market (1996), vol. 40, No. 6, pp. 12-14, Professional Printer.
K. Schlapfter, *The Colour Gamut of the Seven-Colour Printing Process* (1997), vol. 1, pp. 22-25, Research and Technology.
J.A. Stephen Viggiano, et al., *Colorant Selection for Six-Color Lithographic Printing* (1998), pp. 112-115, the Sixth Color Imaging Conference: Color Science, Systems, and Applications.
Samuel T. Ingram, et al., *Ink Fingerprinting* (1998), pp. 660-671, TAGA Proceedings.
Anne Blayo, et al., Rheological Properties of Highly Pigmented Inks: Consequence on the Color Printing Quality (1998), pp. 600-617 [pp. 608-615 not included], TAGA Proceedings.
Samuel T. Ingram, et al., *More than CMYK* (1999), pp. 583-593, TAGA Proceedings.
Di-Yuan Tzeng, et al., *Spectral-Based Ink Selection for Multiple-Ink Printing II. Optimal Ink Selection* (1999), pp. 182-187, The Seventh Color Imaging Conference: Color Science, Systems, and Applications.
Kurt Schlapfer, *Classification of Colour Gamuts of Printing Processes* (2000), pp. 112-129, TAGA Proceedings.
Society of Dyers and Colourists, *Colour Index Hue Indication Chart*, The Six '339 Colors (approx.), American Association of Textile Chemists and Colorists.
Garett Long, et al. (original concept by Dr. Fred Simon), *Color Print-Out of CIELAB Color Names*, Printed in the Graphics Communications Department at Clemson University.
Kenneth Kelly, *The Universal Color Language*, pp. A-1 and A-15, U.S. Department of Commerce.
Andy Perni, et al., *Color to Rival the Original* (1988), p. 53, A New Kind of Color Guide, Step-by-Step.
Roy S. Berns, *Challenges for Colour Science in Multimedia Imaging* (1999), pp. 100-127, Colour Imaging: Vision and Technology.
TAGA '99 Vancouver, *Kaleidoscope of e-Mering Technologies* (1999), No. 129, TAGA Proceedings.

\* cited by examiner

PRINTING SYSTEM

This application is a continuation of application Ser. No. 10/755,674 filed Jan. 13, 2004 now U.S. Pat. No. 7,058,339, which claims benefit of priority from GB 0300640.0 filed Jan. 13, 2003, GB 0321979.7 filed Sep. 19, 2003 and U.S. provisional application Ser. No. 60/442,518 filed Jan. 27, 2003, the entire content of each of which is hereby incorporated by reference in this application.

The present invention relates to a colour is based on the so called well as devices and elements useful in that system.

BACKGROUND OF THE INVENTION

Currently, colour printing is based on the so called 'subtractive primaries' of red, blue and yellow. They are known as the 'subtractive primaries' because when they are mixed, in whatever proportion they become darker, light being absorbed or subtracted.

J. C. Le Blon was among the first to apply the red, yellow, blue theory to colour printing. In fact he invented the 'Three Primary System', which is still widely in use. He applied his red, yellow blue theory to printing, producing fine colour prints in the early part of the 18th century. Most of the detail was printed first from a blue plate, followed by a yellow, red and finally a black plate.

The first edition of his work 'Coloritto' published in 1723 described the production and use of multi coloured mezzotint prints from basic printing inks and registered plates.

The approach developed by Le Blon is still followed today, with only minor adaptations. The 'Three Primary' colours in use are Magenta (red), Cyan (blue) and a mid Yellow. Black is also employed to add detail and delineate form. The use of these four colours (black is a colour), is known as 'Four Colour Process Printing'.

The use of the 'Three Primary System' plus black is the standard in use throughout the printing industry, from desktop computers to large commercial presses.

However severe limitations are encountered when a wide range of colours is to be reproduced.

According to Mr. A. Porni, founder of Design Art Limited, a New York based sheeted and web printer specialising in fine art reproduction. 'Many light, bright and rich colours are not accurately produced in the four colour process. The pale, clean lime greens, oranges, pinks and lavenders tend to reproduce slightly degraded or 'dirty'. Rich, deep Ultramarine blues and maroon red and purples lack the clear translucence and richness when made from tint combinations of process inks'.

Many graphic artists and fine artists wonder why their work cannot be reproduced satisfactorily by any of the forms of conventional printing.

Ever since the publication of the work of Le Blon in the 18th century, it has been generally accepted that 'new' colours are created when the primaries (red, yellow and blue) are mixed. That blue and yellow 'make' green, red and yellow 'make' orange and that blue and red 'make' violet. This belief is universal and is followed by printers, artists, craft-workers and all who mix colours for interest or livelihood.

It has led to a search for "purer" primary colours, on the basis that the 'purer' the primary colour the greater the range of possible mixes, so that absolutely pure versions of red, yellow and blue would allow full colour mixing and printing. Magenta, Cyan and a mid intensity Yellow are felt to be as close to the 'pure' primaries as possible.

Additional inks can be added to the four process colours in particular for certain specialist operations. Pre-mixed colours produced by companies such as 'Pantone Inc' can be added to the four process colours to reproduce particular hues during offset printing for example. This process is however, expensive, does not add much in the way of luminosity, additional value or intensity. The inclusion of such colours can also lead to registration problems.

Certain digital printers, such as desktop printers, also now operate on six colours, they are; magenta, a light magenta, cyan, a light cyan, yellow and black. Extra finesse is available in the violet-red and green-blue ranges and intermixes but the limitations already referred to remain.

In fact, the facility to deliver six differently coloured inks is widely available in all forms of printing. In the case of offset printing, this facility has been 'built in' to allow for additional specialist colours (which are constantly varied depending on the job) or varnishes etc. to be applied.

Where such additional colours or a varnish are applied, a common situation is that the four colours used in four colour process printing, magenta, cyan, yellow and black are applied with one or two pre-mixed colours supplied by companies such as Pantone Inc. Alternatively one pre mixed colour and a varnish might be applied.

However, such machines are typically used only to apply the magenta, cyan, yellow and black of the four colour printing process with the other two printing heads inoperative, until specifically required.

In the case of digital printers, the ability to print six different colours is fairly common, but the colours selected are based upon the existing understanding of the colour mixing process, and therefore, the range of colours achievable is limited.

The present, 'Four Colour Process Printing' system together with its variations, has almost certainly gone as far as it can go.

In fact, 'primaries' do not exist as far as common understanding is concerned. All colours reflect elements of the entire spectrum. Every red, for example, reflects a certain amount of red, orange, yellow, green, blue and violet in varying degrees. (For the sake of clarity the spectrum is described here in its simplest form, as the six main colours normally associated with it, red, orange, green, blue, yellow and violet).

If pure 'primary' colours did exist they would be of little use in colour mixing as they would only ever produce a range of dull neutralised colours, greys and black. A pure red and a pure blue, for example would simply absorb each other's light when mixed, leading towards a black.

SUMMARY OF THE INVENTION

The applicants have formulated a printing system which extends the gamut of colours achievable.

According to the present invention there is provided a colour printing system comprising a combination of at least four coloured materials, each of a different colour, wherein at least three of the four colours are selected from 1. a violet-red;
2. an orange-red;
3. a violet-blue;
4. a green-blue;
5. a green-yellow; and
6. an orange-yellow, provided the combination is other than cyan, magenta, a yellow and black.

In a preferred aspect, the invention provides a colour printing system comprising a combination of six coloured materials, each of a different colour, wherein at least five of the six colours are selected from
1. a violet-red;
2. an orange-red;
3. a violet-blue;
4. a green-blue;
5. a green-yellow; and
6. an orange-yellow.

BRIEF DESCRIPTION OF THE DRAWINGS

FIG. 1 shows examples of the spectra from each of the colours 1-6 used in the invention, wherein

DETAILED DESCRIPTION OF THE INVENTION

The six colours listed above have been selected for their 'leaning' or 'bias' in order to give a widened range of mixes. The six colour-types are defined by their bias toward or away from the 'secondary' colours of orange, green and violet. As used herein the expression "orange-red" refers to a colour which when analysed spectroscopically, reflects in order of 'quantity' or intensity, red followed by orange and then violet. The relative quantities or intensities of each colour can be determined by comparing the areas under the graphs of reflectance (percent) versus wavelength occupied by the specified colour.

Similarly the expression "violet-red" refers to a colour which when analysed spectroscopically, reflects in order of 'quantity' or intensity, red followed by violet and then orange.

The expression "violet-blue" refers to a colour which when analysed spectroscopically, reflects in order of 'quantity' or intensity, blue followed by violet and then green.

The expression "green-blue" refers to a colour which when analysed spectroscopically, reflects in order of 'quantity' or intensity, blue followed by green and then violet.

The expression "green-yellow" refers to a colour which when analysed spectroscopically, reflects in order of 'quantity' or intensity, yellow followed by green and then orange.

The expression "orange-yellow" refers to a colour which when analysed spectroscopically, reflects in order of 'quantity' or intensity, yellow followed by orange and then green.

Figure 1A:
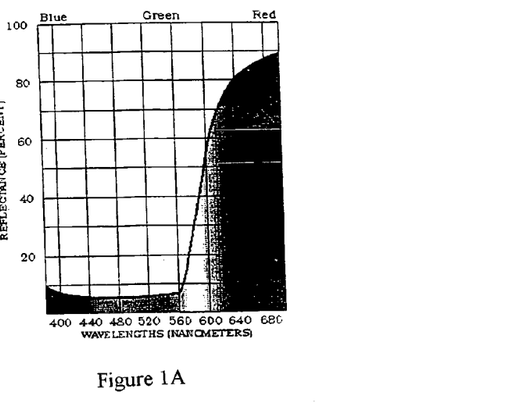
FIG. 1A represents an orange-red.
Figure 1B:
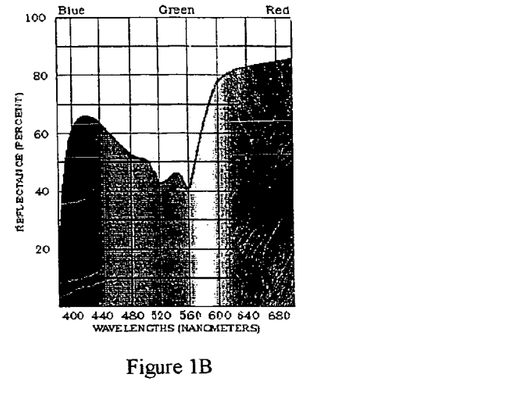
FIG. 1B represents a violet-red.
Figure 1C:
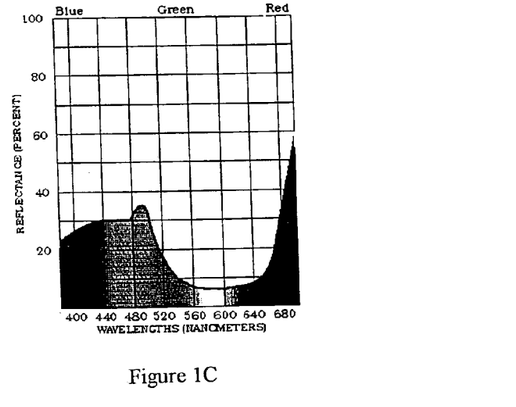
FIG. 1C represents a green-blue.
Figure 1D:
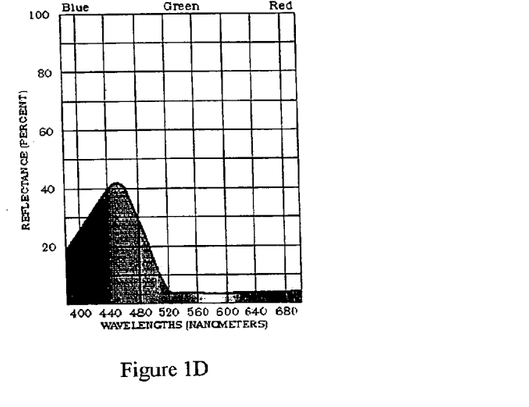
FIG. 1D represents a violet-blue.
Figure 1E:
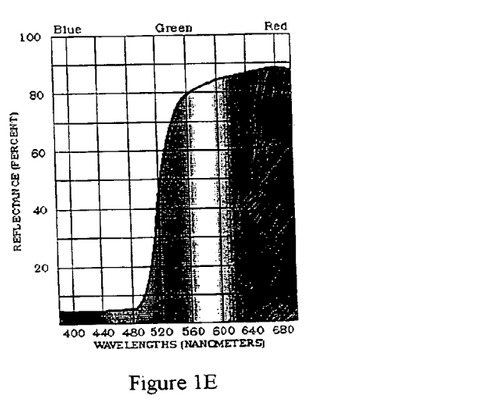
FIG. 1E represents an orange-yellow and FIG. 1F represents a green-yellow.
Figure 1F:
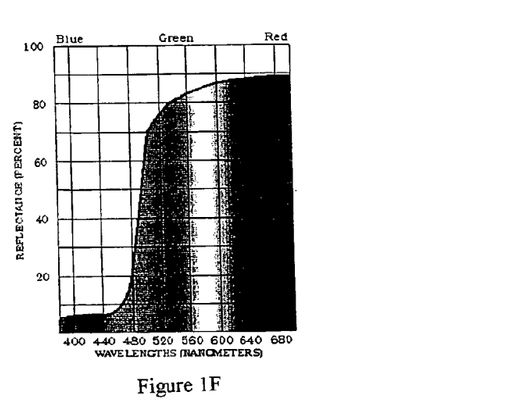

Examples of the spectra from each of the colours 1-6 above are shown hereinafter in FIG. 1. FIG. 1A represents an orange-red, FIG. 1B represents a violet-red, FIG. 1C represents a green-blue, FIG. 1D represents a violet-blue, FIG. 1E represents an orange-yellow and FIG. 1F represents a green-yellow. In fact, all colours will reflect to some extent, all the colours of the spectrum. For instance, every red reflects a certain amount of red, orange, yellow, green, blue and violet. However colours other than those specifically mentioned in respect of the colours listed above, have been found to have little bearing on colour mixing.

Preferably the printing system of the invention includes all six of the colours listed above as (1)-(6). The selection of these six colours will give the widest possible gamut of print colours. However, where necessary a selection from amongst these colours may be made, and the selection may comprise three or four of the colours, combined with black or white.

Preferably these colours are applied simultaneously, for example using a six colour printing system, so that this wide gamut of colours can be achieved from one print pass. This would be particularly suitable for example for the printing of much fine art and high quality books etc.

The coloured materials which make up the system of the invention may be any colouring medium known in printing, such as inks, dyes, toners, pigments, colorants etc. In particular, the coloured materials making up the system of the invention will be coloured printing inks, and especially inks for use in offset printing or in screen printing for example onto fabrics.

Suitably the coloured materials making up the system of the invention are supplied together, for example in a six-part container, one colouring material in each part. Such containers form a further aspect of the invention. They may be modular in nature, for example comprising two modules, each with three-parts, or comprising three modules, each with two parts. Other combinations may be possible. This provides greater flexibility for replenishing colours when one or other becomes used up. The modules are suitably adapted to fit together into the printing device.

The system of the invention is applicable in all forms of colour printing including digital, conventional offset or screen printing or any other conventional form of colour printing, as well as in colour photocopiers.

Thus in a further aspect the invention provides a method of producing a colour print, said method comprising printing onto a substrate, colouring materials of a colour printing system as described above, in a manner and in a mixture so as to produce the desired design and colour thereon. Suitable substrates include paper, fabric such as canvass, plastics, wood, metal etc. as is conventional in the printing art. Generally the substrates will comprise paper or fabric.

For high quality results, the full colour system of the invention is employed. However, this may not be convenient if only a four or even a two colour press is available.

In this case, it would be possible to produce enhanced printing by utilising the invention in a four or even a two colour printing press or system, if this was the only system available. In this case, it is necessary to select from amongst the six colours, those most appropriate to a particular print job.

These could be selected on the basis of an initial scan of the document to be printed. For some jobs the present arrangement using Cyan (a green-blue), magenta (a violet-red), a yellow and black might be the most appropriate. However, in the majority of cases, alternative arrangements would produce better quality results, and in this, the selection would be of at least three of the colours of the system of the invention, and preferably four of said colours, although in some cases, black or even white may be the best option for the fourth colour.

As example, in a job that also required bright violets the cyan of a conventional system would be changed to a violet-blue. Where bright oranges are required the orange-red would be used in place of the magenta (violet-red) and the yellow used would be the orange-yellow.

Interchanging amongst the six hues would be straightforward and the current time consuming colour management element would be dramatically reduced. Unless the machine was used to go onto a different job (requiring another arrangement), without delay, there would be no additional time spent on wash up etc. If it was used for another job straight away perhaps only one or two of the six units would have to be cleaned and the colour changed.

Where only a two colour press is available, this form of the invention could be used by applying the documents in two passes through the press, the first time with two of the selected colours, and the second with the other two, or with the third and black or white.

Thus in a further aspect the invention provides a method for producing a print using a combination of four different inks, which method comprises scanning a document to be printed, determining the optimum selection of four colours from amongst the colours listed as (1)-(6) above as well as black or white for carrying out the job, and using those four colours in a conventional two or four colour printing press.

Generally the selection will involve at least three of the colours listed as (1)-(6) above, together with white or black, and may preferably include a combination of four of the colours listed as (1)-(6) above.

Figure 2:
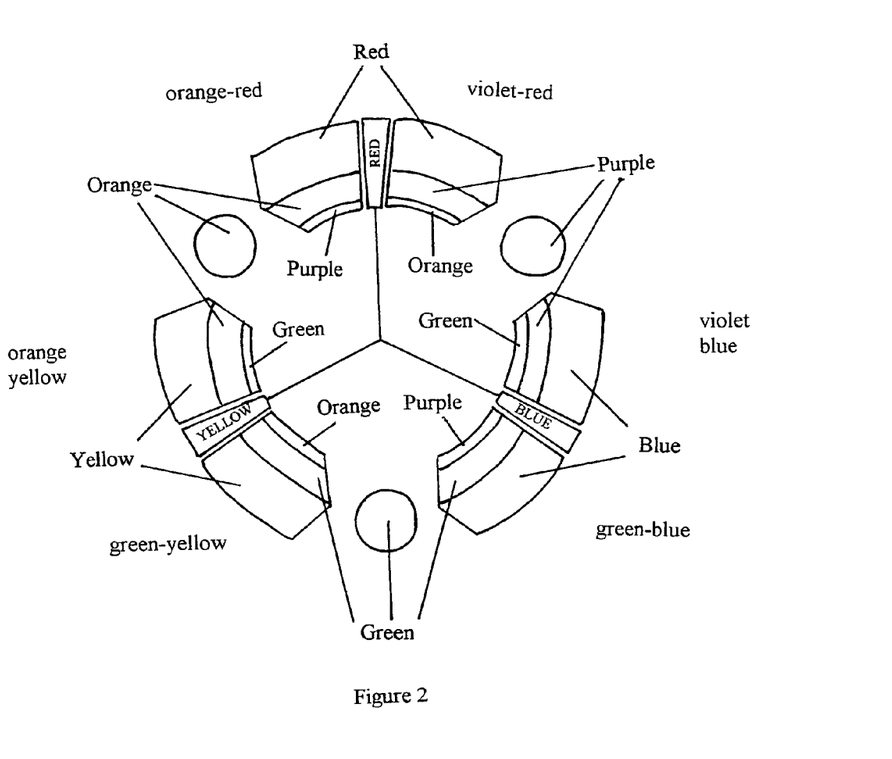
FIG. 2 illustrates a 'Colour Bias Wheel' incorporating the colours of the present invention.

In a further aspect, there is provided a combination of colouring materials selected for use in the method, said combination comprising at least three, and suitably four of the colours listed above as (1)-(6), provided that the combination is other than a combination of cyan, magenta, yellow and black. The six colour types used in the system of the invention are illustrated in FIG. 2 hereinafter, which is known as the 'Colour Bias Wheel'. The six 'colour types' are shown in arrow form to indicate their various biases.

Where a colour-type points towards a 'secondary' colour it indicates that it is an efficient reflector of that secondary colour. In general terms, it will 'leave behind' a high 'quantity' or intensity of the particular secondary colour when appropriately mixed.

Conversely, where a 'colour type' points away from a secondary colour it indicates that it is an inefficient 'reflector' of that secondary colour. Consequently it will 'leave behind' a small 'quantity' or low intensity of the particular secondary colour when appropriately mixed. Thus consideration of the Colour Bias Wheel will allow colours to be mixed appropriately to achieve the target colour.

For example, referring to the Colour Bias Wheel, a 'violet-red' is the ideal red to employ when mixing a bright violet as, after the red, yellow, green, blue and orange content has been absorbed during the mixing process a strong violet content will remain.

The same 'violet-red' is also the colour-type to employ when mixing a dull, greyed orange. The reason for this is that, when appropriately mixed it will 'leave behind' its weak orange 'content'.

To indicate the results that can be predicted when the six colour types are appropriately mixed, the following will describe their functions:

1. Violet-red

This reflects red, followed by violet and then orange. It is therefore particularly useful for producing bright violets and dull oranges, as well as reds.

Typical examples of pigments or dyes which may be used to produce the violet-red colouring material for use in the system of the invention include Pigment Violet 19 (Quinacridone Violet), magenta as well as pigments designated PR2 CIN12310, PR5 CIN12490, PR7 CIN12420, PR23 CIN12355, PR48:4 CIN15865:4, and PR122 CIN12370. Pigment Violet 19 is a transparent, intense pigment, possessing a high violet content. Magenta, although it carries less violet than Pigment Violet 19, is already fully established, and would be suitable for all work which did not require very bright violets.

The abbreviation "CIN" refers to the colour index number, as is recognised in the art.

2. Orange-red

This reflects red followed by orange and then violet. It is therefore useful in producing bright oranges and dull violets. Orange-red colouring materials, such as inks, for use in the system of the invention may be produced for example using pigment Red 108 (Cadmium Red Light). This is not transparent but is able to be thinned to simulate transparency. It is lightfast with a high orange content. Other possible pigments include PR4 CIN12085-PR6 CIN12090, PR9 CIN12460-PR48:1 CIN15865:1, and PR112 CIN12370-PR 188 CIN12467.

3. Violet-blue

As this reflects blue followed by violet and then green, it is useful in producing bright violets and dull greens. A typical violet-blue colouring material for use in the invention are Pigment Blue 29 (Ultramarine Blue), which is transparent, intense and possesses a high violet content, as well as PB1 CIN42595:2.

4. Green-blue

As this reflects blue followed by green and then violet, it will be important in mixing bright greens and dull violets. Pigment Blue 15 (Phthalocyanine Blue), which is transparent, intense and possesses a high green content, is an example of a pigment which may be used to colour the green-blue colouring material of the printing system of the invention. The standard cyan is an alternative that could be used, particularly where the greens did not have to be very bright. Other possible pigments include PB16 CIN74100, PB27 CIN77510 and PB33 CIN77112.

5. Green-yellow

As a reflector of yellow followed by green and then orange, this colour will be an important element when mixing bright greens and dull oranges. An example of a pigment for producing the green-yellow colouring material of the system of the invention is Pigment Yellow 3 (Hansa Yellow), a semi transparent pigment which is lightfast and has a high green content. Other examples of possible pigments include PY4 CIN11665, PY14 CIN21095, PY31 CIN77103 and PY 53 CIN77788.

6. Orange-yellow

As a reflector of yellow followed by orange and then green, this colour will be useful in producing bright oranges and dull greens. Examples of orange-yellow pigments include Pigment Yellow 35 (Cadmium Yellow Light), which is not transparent but, again, is able to be thinned to simulate transparency. It is lightfast with a high orange content. Other examples of possible pigments include PY1:1 CIN11680, PY55 CIN21096, PY83 CIN21108 and PY 95 CIN20034.

Generally speaking, individual colours reflect light in a particular wavelength range, which is summarised in the following Table:

| Colour | Wavelength of light |
| --- | --- |
| Violet | 400-440 nm |
| Blue | 420-490 nm |
| Green | 490-550 nm |

-continued

| Colour | Wavelength of light |
|---|---|
| Yellow | 550-590 nm |
| Orange | 590-620 nm |
| Red | 610-630 nm |

Many factors will influence the actual colouring material that are employed in any particular instance and the particular examples listed above are given by way of illustration only. However, in all cases the 'colour-type' will be the most important element in determining the particular pigment or dye selection.

Using the printing system of the invention, every possible colour available from conventional 'Four Colour Process' printing is achievable. In addition however, a number of improvements are possible. In particular, a wide range of brighter, 'cleaner' oranges, can be obtained, as well as a wide range of brighter 'cleaner' violets (including various pinks, lavenders and purples), a wide range of brighter 'cleaner' greens and a wide range of 'coloured greys'.

In addition, the system of the invention provides a particularly good predictability of final mixed colours.

The principal reasons for the widened colour gamut of the system of the invention is believed to arise for the following reasons.

In conventional 'Four Colour Process' printing, oranges are produced from a combination of Magenta and Yellow. Magenta 'leans' or is 'biased' towards violet (a violet-red). The yellow employed varies between a yellow which is slightly 'biased' towards orange (an orange-yellow) and a yellow which is slightly 'biased' towards green, a (green-yellow).

If the yellow used is a 'green-yellow' as described above, the mixed orange will be dull and greyed, because both the violet-red and the green-yellow are poor 'carriers' of orange. In other words neither reflects much orange and therefore cannot leave much of that colour behind after the subtractive process of mixing has taken place.

If the yellow used is an 'orange-yellow', the mixed orange will be at best of mid-intensity of brightness. This is because the violet-red is a poor "carrier" of orange and the orange-yellow is a good "carrier". Therefore, the violet-red magenta cannot leave much orange behind after the subtractive process has taken place, whereas the yellow will leave a large 'amount'. However, a combination of a small 'amount' with a large 'amount' leads only to a mid-intensity orange. The colour cannot be any brighter as only the yellow is making any significant contribution of orange.

In contrast, using the six colour system of the invention, the same range of dull, greyed oranges, as well as the mid-intensity oranges outlined above will still be available by selecting the appropriate colour types (the violet-red with either the green-yellow or the orange-yellow). However, by using the available orange-red in place of the violet-red, and combining this with the orange-yellow, a range of bright oranges will also be available. This is because both the orange-red and the orange-yellow reflect a 'lot' of orange. The two "large amounts" of orange left behind after the subtractive process of mixing occurs will ensure the required brightness.

In addition, the range of violets, pinks, lavenders and purples is severely limited in Four Colour Process printing, particularly at the blue end of the ranges. Magenta, a violet-red, is a good contributor of violet but the cyan, a green-blue is not, being a poor carrier of violet. When magenta and cyan are mixed in any form of printing the subtractive process leaves behind the large 'amount' of violet in the violet-red but only a small 'amount' from the green-blue. At best, a violet produced this way can only ever be described as being of mid-intensity. The red violets are brighter than the blue violets as they are influenced by the 'extra' violet in the red, but the blue violets do not have this benefit.

Using the printing system of the invention however, the same range of mid-intensity violets outlined above will still be available as the same colour types, (the violet-red and the green-blue) are still available. However, a range of bright violets will also be available. They will be bright because the two colours which are vital for their production, a violet-red and a violet-blue will now be present. Violet-red and violet-blue both reflect a 'lot' of violet. The two 'large amounts' of violet left behind after the subtractive process will ensure the required brightness.

Similar considerations allow a wide range of brighter 'cleaner' greens to be produced using the system of the invention.

The range of greens available from Four Colour Process varies depending on the type of yellow in use. A 'mid' yellow, without a strong bias in either direction (either towards green or orange) is typical. Such a yellow will only ever produce mid-intensity greens as it carries only a moderate 'amount' of green.

If a yellow with a leaning towards orange is used the greens cannot be brighter than low-intensity (dull and greyed), as the yellow will leave very little green 'behind' after the subtractive process.

In addition to these factors, cyan is not the ideal green-blue when it comes to the production of bright greens. It is more of a compromise chosen to give 'reasonably' bright violets and greens.

In the system of the invention, a green-blue ink, preferably with a strong leaning towards green is used. A green-blue based on Pigment Blue 15 (Phthalocyanine) would be one option. As both yellow types, (green-yellow and orange-yellow) would be in use, the selection of the rich, green bearing yellow would be automatic. When both the blue and the yellow are strongly biased towards green, very bright, intense greens become available.

The traditional printing primaries, magenta, cyan and yellow can be combined to give reasonable darks but it means printing all three colours, one onto the other. Because the results are less than satisfactory, a black ink is also used. The three primary colours plus black make up the four colours in conventional Four Colour Process printing.

Black is used to darken colours and to add detail. It is used to define shadow, middle tone and outline. Too little black results in a lack of contrast. In essence, when reproducing an artwork, it is usual to put a black vignette around every object in an artwork, thus inhibiting or stopping the colour progression required for the illusion of depth.

However, the use of black 'dirties' colours, limits luminosity and the gradation of value required to add realistic depth. Obtaining the correct balance of black to the other three colours can be very difficult. The printing press operator usually makes the final decision by eye based on the colour proofs that have been supplied. The black content is generally adjusted at the final print stage by controlling the black ink flow at the print head. Too much black results in very dull, 'heavy' colours overall, a loss of detail in shadows or other dark areas and pale greys disappear. Reproductions of photographs lose dimension and luminosity. Artwork, paintings etc. lose 'depth' through the limited range of values available.

Generally speaking the system of the invention does not use black in colour printing. However, colours can be darkened by adding the complementary colour. For example, yellow would darken violet (and vice versa), green would darken red (and vice versa) and blue would darken orange (and vice versa).

The system of the invention suitably uses this approach to achieve dark colours or near blacks, in a particularly refined way. For instance, a green-yellow can be used to darken a red-violet (and vice versa) and an orange-yellow used to darken blue violet (and vice versa). A blue-green would darken an orange-red (and vice versa) and a yellow-green, a violet-red (and vice versa). Green-blue would be used to darken a red-orange (and vice versa) and a violet-blue to deepen a yellow-orange (and vice versa).

As each colour pair approached equal intensity so the resulting hue would become darker.

A vast range of coloured greys can be automatically obtained through the efficient mixing of the complementary colours.

Neutrals can also be produced automatically. Colours obtained without using black will appear to be more luminous and a vast range of values will be available. The availability of 'luminous', 'clean' colours which can be made to recede in depth over a wide range of shifting values will enhance the accuracy of reproduction of all forms of artwork, including fine art.

In addition, by removing black from the process it will be far easier to predict the final results. The use of two types of blue, two types of red and two types of yellow will also aid predictability to a considerable extent.

Using all six colours of the system of the invention will therefore be particularly useful in a wide variety of situations. Black or near black may be mixed from complementary colours in many situations, for example to produce say a limited amount of text which accompanies many pieces of artwork, such as the title of a painting. One of the most important areas as far as accurate colour reproduction is concerned lies in the reproduction of artwork, paintings etc. Known as 'Giclee' the practice is becoming widespread with many companies and individuals reproducing artwork on specialised papers. The amount of black text required with this type of work is usually limited to the name of the painting and the artist. In such cases the black can be produced using complementary colours of the six colours of the system of the invention as discussed above.

There may be some occasions however, where the inclusion of black in the system becomes highly desirable, for example where large quantities of text are present, for example in the printing of a colour illustrated book.

The system of the invention may be adapted to take account of this requirement in one of two ways. First of all, where a colour work does not require all the six colours of the system, one of the six colours, which is not required, can be replaced with black to print the text. Whether or not a particular colour is going to be required in any particular case can be determined using a colour scan. If this scan did not show the need for the use of say the orange-yellow ink, because the colour work did not require the depiction of bright oranges, the orange-yellow ink could be replaced with a black ink.

Alternatively, where all six colours are needed for accurate colour reproduction of a particular work, the black ink can be added as a further element to the system. In most six colour printer arrangements, for example in offset printing or in digital printers, this may not be possible at a single pass, as the six colours making up the system of the invention will occupy all available print heads, offset printing plates or ink containers in the case of digital printers. In such cases, the colour work could be printed in an initial print run with the black text applied on a separate printer. This could be a simple one-colour printer. Absolute accuracy of registration is not normally critical where text is concerned.

Similar considerations apply with regard to the use of white colouring material such as printing ink. When white is added, for example as an ink or pigment, to any hue, it dulls the colour and makes otherwise transparent inks or paints more opaque. These qualities lead to tints (lighter versions of a colour), which are different to an ink or paint made lighter by allowing the background white to show through thinly applied or transparent inks or paints. White colouring material therefore, might be included in a system of the invention to produce lighter versions of any printable colour.

Modification of a printer to allow it to deliver seven colours is also possible. In this case, the six colours of the system of the invention may be supplemented with black to provide maximal flexibility. Such printers may be novel and form a further aspect of the invention.

A two or more colour printer would be required where the finished product (book or similar) required all the six colours of the system of the invention as well as black text and a varnish or other specialised finish such as an application of metallic or fluorescent ink.

Where printing systems used provide for the use of inks which are individual and interchangeable, one of the colours, if not required, could be changed for black ink, on a case-by-case basis.

Figure 3:
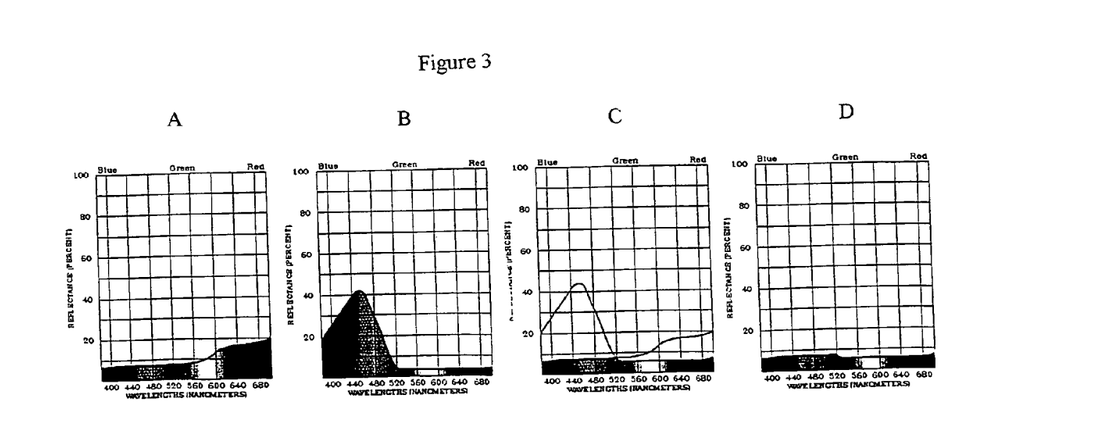
FIG. 3 shows the wavelengths reflected by a dark orange such as Burnt Sienna (FIG. 3a), the wavelengths reflected by violet-blue such as Ultramarine Blue, (FIG. 3b), a combination of these (FIG. 3c), and the resultant reflectance of a mixture (FIG. 3d).

There may be occasions however, where black is needed in the reproduction of colour artwork. Again the system of the invention may be readily modified to accommodate this. As discussed above, 'soft' blacks are available using the range of complementary colours present within the system. Where a particularly dense black is required, over large areas, one of the six colour types least required may be replaced with a dark, neutralised orange such as Pigment Brown 7, Burnt Sienna. This is correctly biased to produce a dense 'velvety' black when mixed with violet-blue, as illustrated in FIG. 3.

The wavelengths reflected by a dark orange such as Burnt Sienna are illustrated in FIG. 3a, and the wavelengths reflected violet-blue such as Ultramarine Blue, are illustrated in FIG. 3b. On mixing (FIG. 3c), the subtractive process occurs (FIG. 3d) resulting in very little light being reflected, and so giving the appearance of a deep black.

Alternatively, for the fullest possible gamut from this approach, the dark orange could be printed separately, for example on a seventh printing plate of an offset printing process. However, the occasions when such very dark blacks are required will probably be relatively few.

The software required to instruct the printing press can be developed without difficulty using the conventional methods, and based upon the consideration of the Bias Wheel as set out above. Similarly the software required when an original work is scanned in preparation for digital printing, printing film or when printing direct from plate, can be readily devised.

Printing devices incorporating the colour system described above forms a further embodiment of the invention.

With the advent of the computer printer and advances made in colour copiers, companies operating offset presses have lost a share of their previous market. In an effort to compensate for this shortfall many have offered additional facilities such as the printing of varnishes, metallic inks and fluorescent inks. These additional facilities have meant that many operators have installed printing presses with six print heads. Such machines are suitable for use in with the system of the invention. All that will be required for their conversion will be new software and a different range of printing inks. The combination of an offset printing press with six printing heads, a combination of printing inks following the system described above, wherein the press is programmed to mix said inks to produce a range of target colours, forms a further aspect of the invention.

In the case of digital printing (desktop printers etc.), machines already exist which can apply six colours. They also may be programmed to utilise the system of the invention, provided only that an appropriate range of inks is included in the ink cartridges. Such printers, together with the cartridges for use in the printers form yet further aspects of the invention. New machines fully adapted to this system may be developed as the need for improvement in colour reproduction leads to greater competition.

The system may also be adapted for use in colour photocopiers. A toner system for a colour photocopier incorporating the printing system of the invention, together with a colour photocopier incorporating said toner system forms yet a further aspect of the invention.

When reproducing works such as artworks in prints, the existing technology involved in the preparation of printing film, printing plates and similar for example for offset printers may be readily adapted for use with the system of the invention.

For example, one method of recording the initial image is to record the image using a digital camera. This is currently one of the most accurate ways to record colours and these may be converted into the six subtractive hues of the system of the invention.

In addition, there are several ways to separate 'warm' and 'cool' dots from a continuous tone photograph.

Firstly, the continuous tone photograph can be shot through filters and a halftone screen or stochastic halftone screen to separate the halftone dots of red, yellow and blue of the artwork. The use of a stochastic screen has quality advantages over a regular halftone screen. The detail rendition is clean and clear and there is no interference or moiré. The contrast is well defined because the halftones dots do not overlap and touch. This produces greater detail, smoother gradation, more values and patterns are not created by converging screen angles or dot groups. With a stochastic screen, light and dark areas are achieved by varying the distance between dots. With either screen the value range of shadows could be extended to 49% into the middle tone by using a main exposure and then a flash exposure or a no screen (bump) light to extend the highlight dots down to 50% middle tone. Two negatives in register can be used for 'warm' and 'cool' versions of the same basic colour (red, yellow or blue).

An alternative method is to scan the image into a computer using a flatbed scanner, drum scanner or similar. A program such as Adobe Photoshop can be employed for this process.

Adobe Photoshop converts images (or sample points) in the form of pixels into electronically digitized information. On each sample point, all six colours are picked up and assigned one of 256 grey levels. If necessary it is possible to make adjustments to a single pixel.

The computer takes data in pixel form and converts pixels to halftone dots using a 150 line (halftone screen). There are four times more pixels than dots. The pixel information will determine the size and shape of the dots. The program will allow the separation of 'warm' and 'cool' colours via the layers palette, then the curves dialogue box or variations command box. The dot percentages for each of the six negatives can then be defined. After the selection of the dot percentages for each 'warm' and 'cool' colour the negatives can be burnt onto the six printing plates.

The process of producing printing plates using the system of the invention can be commenced by using a halftone screen and filter to separate a picture into six negatives. One negative is created for each of the six colour types, the two reds, two blues and two yellows. A process camera, scanner and/or computer separates the six colour types. A halftone screen is the photomechanical reproduction of continuous-tone copy in which gradations of tone are obtained by the relative size and density of tiny dots produced by photographing through a cross lined screen. The 'warm' colours, orange-yellow, orange-red and violet-blue would have reproduction dots of 50% to 99% and the 'cool' colours, green-yellow, violet-red and green-blue would have dots of 1% to 49%. The lightest 'cool' colour is not as light as the darkest 'warm' colour.

The dot percentages are different for each colour reflected by the picture photographed or scanned. The screen is then rotated 45 degrees for both blues, 75 degrees for both reds and 105 degrees for both yellows. This will ensure that there will be no overlapping at the dot top that could cause a moiré effect. Using the halftone screen, dot images are burnt for each colour onto six printing plates.

In summary, the system of the invention provides a widely applicable printing system, which allows for much better colour reproduction over a wider gamut of colours than are available in conventional colour printing. It does not require the occasional use of specially mixed, single purpose hues.

Although it requires the use of specialised software both for printing, and where appropriate in scanning, and the selection of suitable inks, printers of all types including pre-existing printers, may be utilised.

The invention claimed is:

1. A colour printing system comprising a combination of at least four coloured materials, each of a different colour, wherein at least three of the four colours are selected from:
   (1) a violet-red, wherein red has a highest peak reflectance percentage, followed by violet as next highest peak reflectance percentage and then orange as third highest peak reflectance percentage;
   (2) an orange-red, wherein red has a highest peak reflectance percentage, followed by orange as next highest peak reflectance percentage and then violet as third highest peak reflectance percentage;
   (3) a violet-blue, wherein blue has a highest peak reflectance percentage, followed by violet as next highest peak reflectance percentage and then green as third highest peak reflectance percentage;
   (4) a green-blue, wherein blue has a highest peak reflectance percentage, followed by green as next highest peak reflectance percentage and then violet as third highest peak reflectance percentage;
   (5) a green-yellow, wherein yellow has a highest peak reflectance percentage, followed by green as next highest peak reflectance percentage and then orange as third highest peak reflectance percentage; and
   (6) an orange-yellow, wherein yellow has a highest peak reflectance percentage, followed by orange as next highest peak reflectance percentage and then green as third highest peak reflectance percentage,
provided the combination is other than cyan, magenta, a yellow and black.

2. A colour printing system according to claim 1 which comprises colouring materials of all six of the colours of (1)-(6).

3. A colour printing system according to claim 1 which comprises colouring materials of five of the said six colours, and the sixth colouring material is black or white.

4. A colour printing system according to claim 1 wherein each colouring material is an ink, dye, toner or pigment.

5. A colour printing system according to claim 1, wherein violet reflects light in the wavelength range of about 400-440 nm, blue reflects light in the wavelength range of about 420-490 nm, green reflects light in the wavelength range of about 490-550 nm, yellow reflects light in the wavelength range of about 550-590 nm, orange reflects light in the wavelength range about 590-620 nm, and red reflects light in the wavelength range of about 610-630 nm.

6. A method for producing a print using a combination of four different inks, which method comprises scanning a document to be printed, determining the optimum selection of four colours from amongst the colours listed as (1)-(6) below:

(1) a violet-red, wherein red has a highest peak reflectance percentage, followed by violet as next highest peak reflectance percentage and then orange as third highest peak reflectance percentage;

(2) an orange-red, wherein red has a highest peak reflectance percentage, followed by orange as next highest peak reflectance percentage and then violet as third highest peak reflectance percentage;

(3) a violet-blue, wherein blue has a highest peak reflectance percentage, followed by violet as next highest peak reflectance percentage and then green as third highest peak reflectance percentage;

(4) a green-blue, wherein blue has a highest peak reflectance percentage, followed by green as next highest peak reflectance percentage and then violet as third highest peak reflectance percentage;

(5) a green-yellow, wherein yellow has a highest peak reflectance percentage, followed by green as next highest peak reflectance percentage and then orange as third highest peak reflectance percentage; and (6) an orange-yellow, wherein yellow has a highest peak reflectance percentage, followed by orange as next highest peak reflectance percentage and then green as third highest peak reflectance percentage, as well as black or white as a fifth ink colour for carrying out the job, and using those four colours in a two or four colour printing press.

7. A colour printing system comprising a combination of at least four coloured materials, each of a different colour, wherein at least three of the four colours are selected from:

(1) a violet-red, wherein red has a higher peak reflectance percentage than violet, and violet has a higher peak reflectance percentage than orange;

(2) an orange-red, wherein red has a higher peak reflectance percentage than orange, and orange has a higher peak reflectance percentage than violet;

(3) a violet-blue, wherein blue has a higher peak reflectance percentage than violet, and violet has a higher peak reflectance percentage than green;

(4) a green-blue, wherein blue has a higher peak reflectance percentage than green, and green has a higher peak reflectance percentage than violet;

(5) a green-yellow, wherein yellow has a higher peak reflectance percentage than green, and green has a higher peak reflectance percentage than orange; and (6) an orange-yellow, wherein yellow has a higher peak reflectance percentage than orange, and orange has a higher peak reflectance percentage than green;

provided the combination is other than cyan, magenta, a yellow and black.

8. A colour printing system according to claim 7, wherein violet reflects light in the wavelength range of about 400-440 nm, blue reflects light in the wavelength range of about 420-490 nm, green reflects light in the wavelength range of about 490-550 nm, yellow reflects light in the wavelength range of about 550-590 nm, orange reflects light in the wavelength range about 590-620 nm, and red reflects light in the wavelength range of about 610-630 nm.

9. A colour printing system according to claim 7 wherein each colouring material is an ink, dye, toner or pigment.

10. A method for producing a print using a combination of four different inks, which method comprises scanning a document to be printed, determining the optimum selection of four colours from amongst the colours listed as (1)-(6) below:

(1) a violet-red, wherein red has a higher peak reflectance percentage than violet, and violet has a higher peak reflectance percentage than orange;

(2) an orange-red, wherein red has a higher peak reflectance percentage than orange, and orange has a higher peak reflectance percentage than violet;

(3) a violet-blue, wherein blue has a higher peak reflectance percentage than violet, and violet has a higher peak reflectance percentage than green;

(4) a green-blue, wherein blue has a higher peak reflectance percentage than green, and green has a higher peak reflectance percentage than violet;

(5) a green-yellow, wherein yellow has a higher peak reflectance percentage than green, and green has a higher peak reflectance percentage than orange; and (6) an orange-yellow, wherein yellow has a higher peak reflectance percentage than orange, and orange has a higher peak reflectance percentage than green;

as well as black or white as a fifth ink colour for carrying out the job, and using those four colours in a two or four colour printing press.

11. A colour printing system comprising a combination of at least four coloured materials, each of a different colour, wherein at least three of the four colours are selected from:

(1) a violet-red, wherein red has a higher intensity than violet, and violet has a higher intensity than orange;

(2) an orange-red, wherein red has a higher intensity than orange, and orange has a higher intensity than violet;

(3) a violet-blue, wherein blue has a higher intensity than violet, and violet has a higher intensity than green;

(4) a green-blue, wherein blue has a higher intensity than green, and green has a higher intensity than violet;

(5) a green-yellow, wherein yellow has a higher intensity than green, and green has a higher intensity than orange; and (6) an orange-yellow, wherein yellow has a higher intensity than orange, and orange has a higher intensity than green;

provided the combination is other than cyan, magenta, a yellow and black.

12. A colour printing system according to claim 11, wherein violet reflects light in the wavelength range of about 400-440 nm, blue reflects light in the wavelength range of about 420-490 nm, green reflects light in the wavelength range of about 490-550 nm, yellow reflects light in the wavelength range of about 550-590 nm, orange reflects light in the wavelength range about 590-620 nm, and red reflects light in the wavelength range of about 610-630 nm.

13. A colour printing system according to claim 11 wherein each colouring material is an ink, dye, toner or pigment.

14. A method for producing a print using a combination of four different inks, which method comprises scanning a document to be printed, determining the optimum selection of four colours from amongst the colours listed as (1)-(6) below:

(1) a violet-red, wherein red has a higher intensity than violet, and violet has a higher intensity than orange;

(2) an orange-red, wherein red has a higher intensity than orange, and orange has a higher intensity than violet;
(3) a violet-blue, wherein blue has a higher intensity than violet, and violet has a higher intensity than green;
(4) a green-blue, wherein blue has a higher intensity than green, and green has a higher intensity than violet;
(5) a green-yellow, wherein yellow has a higher intensity than green, and green has a higher intensity than orange; and
(6) an orange-yellow, wherein yellow has a higher intensity than orange, and orange has a higher intensity than green;

as well as black or white as a fifth ink colour for carrying out the job, and using those four colours in a two or four colour printing press.

15. A colour printing system comprising a combination of at least four coloured materials, each of a different colour, wherein at least three of the four colours are selected from:
(1) a violet-red, wherein red has a higher peak intensity than violet, and violet has a higher peak intensity than orange;
(2) an orange-red, wherein red has a higher peak intensity than orange, and orange has a higher peak intensity than violet;
(3) a violet-blue, wherein blue has a higher peak intensity than violet, and violet has a higher peak intensity than green;
(4) a green-blue, wherein blue has a higher peak intensity than green, and green has a higher peak intensity than violet;
(5) a green-yellow, wherein yellow has a higher peak intensity than green, and green has a higher peak intensity than orange; and
(6) an orange-yellow, wherein yellow has a higher peak intensity than orange, and orange has a higher peak intensity than green;

provided the combination is other than cyan, magenta, a yellow and black.

16. A colour printing system according to claim 15, wherein violet reflects light in the wavelength range of about 400-440 nm, blue reflects light in the wavelength range of about 420-490 nm, green reflects light in the wavelength range of about 490-550 nm, yellow reflects light in the wavelength range of about 550-590 nm, orange reflects light in the wavelength range about 590-620 nm, and red reflects light in the wavelength range of about 610-630 nm.

17. A colour printing system according to claim 15 wherein each colouring material is an ink, dye, toner or pigment.

18. A method for producing a print using a combination of four different inks, which method comprises scanning a document to be printed, determining the optimum selection of four colours from amongst the colours listed as (1)-(6) below:
(1) a violet-red, wherein red has a higher peak intensity than violet, and violet has a higher peak intensity than orange;
(2) an orange-red, wherein red has a higher peak intensity than orange, and orange has a higher peak intensity than violet;
(3) a violet-blue, wherein blue has a higher peak intensity than violet, and violet has a higher peak intensity than green;
(4) a green-blue, wherein blue has a higher peak intensity than green, and green has a higher peak intensity than violet;
(5) a green-yellow, wherein yellow has a higher peak intensity than green, and green has a higher peak intensity than orange; and
(6) an orange-yellow, wherein yellow has a higher peak intensity than orange, and orange has a higher peak intensity than green;

as well as black or white as a fifth ink colour for carrying out the job, and using those four colours in a two or four colour printing press.

19. A colour printing system comprising a combination of at least four coloured materials, each of a different colour, wherein at least three of the four colours are selected from:
(1) a violet-red, wherein red has a higher dominant intensity than violet, and violet has a higher dominant intensity than orange;
(2) an orange-red, wherein red has a higher dominant intensity than orange, and orange has a higher dominant intensity than violet;
(3) a violet-blue, wherein blue has a higher dominant intensity than violet, and violet has a higher dominant intensity than green;
(4) a green-blue, wherein blue has a higher dominant intensity than green, and green has a higher dominant intensity than violet;
(5) a green-yellow, wherein yellow has a higher dominant intensity than green, and green has a higher dominant intensity than orange; and
(6) an orange-yellow, wherein yellow has a higher dominant intensity than orange, and orange has a higher dominant intensity than green;

provided the combination is other than cyan, magenta, a yellow and black.

20. A colour printing system according to claim 19, wherein violet reflects light in the wavelength range of about 400-440 nm, blue reflects light in the wavelength range of about 420-490 nm, green reflects light in the wavelength range of about 490-550 nm, yellow reflects light in the wavelength range of about 550-590 nm, orange reflects light in the wavelength range about 590-620 nm, and red reflects light in the wavelength range of about 610-630 nm.

21. A colour printing system according to claim 19 wherein each colouring material is an ink, dye, toner or pigment.

22. A method for producing a print using a combination of four different inks, which method comprises scanning a document to be printed, determining the optimum selection of four colours from amongst the colours listed as (1)-(6) below:
(1) a violet-red, wherein red has a higher dominant intensity than violet, and violet has a higher dominant intensity than orange;
(2) an orange-red, wherein red has a higher dominant intensity than orange, and orange has a higher dominant intensity than violet;
(3) a violet-blue, wherein blue has a higher dominant intensity than violet, and violet has a higher dominant intensity than green;
(4) a green-blue, wherein blue has a higher dominant intensity than green, and green has a higher dominant intensity than violet;
(5) a green-yellow, wherein yellow has a higher dominant intensity than green, and green has a higher dominant intensity than orange; and
(6) an orange-yellow, wherein yellow has a higher dominant intensity than orange, and orange has a higher dominant intensity than green;

as well as black or white as a fifth ink colour for carrying out the job, and using those four colours in a two or four colour printing press.

23. A colour printing system comprising a combination of at least four coloured materials, each of a different colour, wherein at least three of the four colours are selected from (1) a violet-red, wherein for such colour, red has a greatest area under a graph of reflectance (percent) versus wavelength, followed by violet as having a next greatest area under said graph, and then orange as having a third greatest area under said graph;

(2) an orange-red, wherein for such colour, red has a greatest area under a graph of reflectance (percent) versus wavelength, followed by orange as having a next greatest area under said graph, and then violet as having a third greatest area under said graph;

(3) a violet-blue, wherein for such colour, blue has a greatest area under a graph of reflectance (percent) versus wavelength, followed by violet as having a next greatest area under said graph, and then green as having a third greatest area under said graph;

(4) a green-blue, wherein for such colour, blue has a greatest area under a graph of reflectance (percent) versus wavelength, followed by green as having a next greatest area under said graph, and then violet as having a third greatest area under said graph;

(5) a green-yellow, wherein for such colour, yellow has a greatest area under a graph of reflectance (percent) versus wavelength, followed by green as having a next greatest area under said graph, and then orange as having a third greatest area under said graph; and (6) an orange-yellow, wherein for such colour, yellow has a greatest area under a graph of reflectance (percent) versus wavelength, followed by orange as having a next greatest area under said graph, and then green as having a third greatest area under said graph, provided the combination is other than cyan, magenta, a yellow and black.

24. A colour printing system according to claim 23, wherein violet reflects light in the wavelength range of about 400-440 nm, blue reflects light in the wavelength range of about 420-490 nm, green reflects light in the wavelength range of about 490-550 nm, yellow reflects light in the wavelength range of about 550-590 nm, orange reflects light in the wavelength range about 590-620 nm, and red reflects light in the wavelength range of about 610-630 nm.

25. A colour printing system according to claim 23 wherein each colouring material is an ink, dye, toner or pigment.

26. A method for producing a print using a combination of at least four different inks, which method comprises scanning a document to be printed, determining the optimum selection of four colours from amongst the colours listed as (1)-(6) below:

(1) a violet-red, wherein for such colour, red has a greatest area under a graph of reflectance (percent) versus wavelength, followed by violet as having a next greatest area under said graph, and then orange as having a third greatest area under said graph;

(2) an orange-red, wherein for such colour, red has a greatest area under a graph of reflectance (percent) versus wavelength, followed by orange as having a next greatest area under said graph, and then violet as having a third greatest area under said graph;

(3) a violet-blue, wherein for such colour, blue has a greatest area under a graph of reflectance (percent) versus wavelength, followed by violet as having a next greatest area under said graph, and then green as having a third greatest area under said graph;

(4) a green-blue, wherein for such colour, blue has a greatest area under a graph of reflectance (percent) versus wavelength, followed by green as having a next greatest area under said graph, and then violet as having a third greatest area under said graph;

(5) a green-yellow, wherein for such colour, yellow has a greatest area under a graph of reflectance (percent) versus wavelength, followed by green as having a next greatest area under said graph, and then orange as having a third greatest area under said graph; and (6) an orange-yellow, wherein for such colour, yellow has a greatest area under a graph of reflectance (percent) versus wavelength, followed by orange as having a next greatest area under said graph, and then green as having a third greatest area under said graph, as well as black or white as a fifth ink colour for carrying out the job, and using those four colours in a two or four colour printing press.

27. A colour printing system comprising a combination of at least four coloured materials, each of a different colour, wherein at least three of the four colours are selected from (1) a violet-red, wherein for such colour, red has a greater area under a graph of reflectance (percent) versus wavelength than violet, and violet has a greater area under a graph of reflectance (percent) versus wavelength than orange;

(2) an orange-red, wherein for such colour, red has a greater area under a graph of reflectance (percent) versus wavelength than orange, and orange has a greater area under a graph of reflectance (percent) than violet;

(3) a violet-blue, wherein for such colour, blue has a greater area under a graph of reflectance (percent) versus wavelength than violet, and violet has a greater areas under a graph of reflectance (percent) versus wavelength than green;

(4) a green-blue, wherein for such colour, blue has a greater area under a graph of reflectance (percent) versus wavelength than green, and green has a greater area under a graph of reflectance (percent) versus wavelength than violet;

(5) a green-yellow, wherein for such colour, yellow has a greater area under a graph of reflectance (percent) versus wavelength than green, and green has a greater area under a graph of reflectance (percent) versus wavelength than orange; and (6) an orange-yellow, wherein for such colour, yellow has a greater area under a graph of reflectance (percent). versus wavelength than orange, and orange has a greater area under a graph of reflectance (percent) versus wavelength than green;

provided the combination is other than cyan, magenta, a yellow and black.

28. A colour printing system according to claim 27, wherein violet reflects light in the wavelength range of about 400-440 nm, blue reflects light in the wavelength range of about 420-490 nm, green reflects light in the wavelength range of about 490-550 nm, yellow reflects light in the wavelength range of about 550-590 nm, orange reflects light in the wavelength range about 590-620 nm, and red reflects light in the wavelength range of about 610-630 nm.

29. A colour printing system according to claim 27 wherein each colouring material is an ink, dye, toner or pigment.

30. A method for producing a print using a combination of at least four different inks, which method comprises scanning a document to be printed, determining the optimum selection of four colours from amongst the colours listed as (1)-(6) below:

(1) a violet-red, wherein for such colour, red has a greater area under a graph of reflectance (percent) versus wavelength than violet, and violet has a greater area under a graph of reflectance (percent) versus wavelength than orange;

(2) an orange-red, wherein for such colour, red has a greater area under a graph of reflectance (percent) versus wavelength than orange, and orange has a greater area under a graph of reflectance (percent) than violet;

(3) a violet-blue, wherein for such colour, blue has a greater area under a graph of reflectance (percent) versus wavelength than violet, and violet has a greater areas under a graph of reflectance (percent) versus wavelength than green;

(4) a green-blue, wherein for such colour, blue has a greater area under a graph of reflectance (percent) versus wavelength than green, and green has a greater area under a graph of reflectance (percent) versus wavelength than violet;

(5) a green-yellow, wherein for such colour, yellow has a greater area under a graph of reflectance (percent) versus wavelength than green, and green has a greater area under a graph of reflectance (percent) versus wavelength than orange; and (6) an orange-yellow, wherein for such colour, yellow has a greater area under a graph of reflectance (percent) versus wavelength than orange, and orange has a greater area under a graph of reflectance (percent) versus wavelength than green;

as well as black or white as a fifth ink colour for carrying out the job, and using those four colours in a two or four colour printing press.

* * * * *